J. K. STEWART.
SPEEDOMETER DRIVE GEAR.
APPLICATION FILED JUNE 11, 1913.
1,148,125.
Patented July 27, 1915.
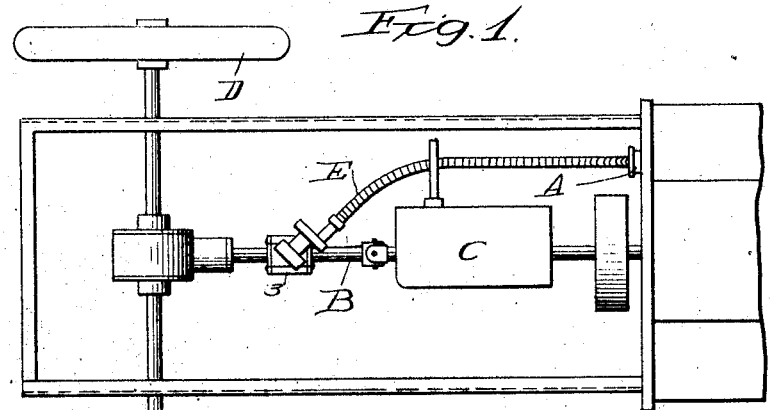
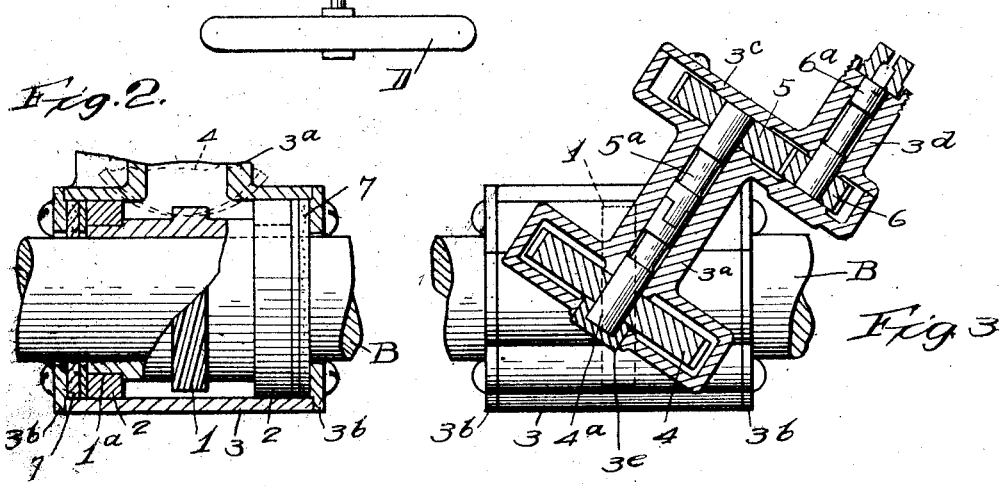
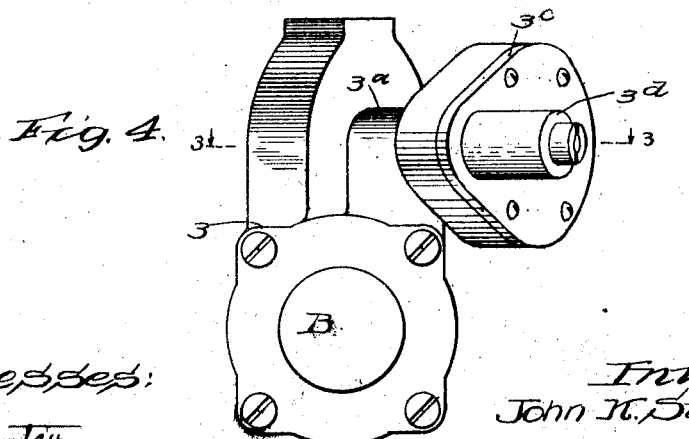
Witnesses:
Inventor:
John K. Stewart
by Burton & Burton
his attys

UNITED STATES PATENT OFFICE.

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEEDOMETER DRIVE-GEAR.

1,148,125.

Specification of Letters Patent.

Patented July 27, 1915.

Application filed June 11, 1913. Serial No. 773,016.

*To all whom it may concern:*

Be it known that I, JOHN K. STEWART, a citizen of the United States, residing at Chicago, in the county of Cook and State of Illinois, have invented new and useful Improvements in Speedometer Drive-Gears, of which the following is a specification, reference being had to the accompanying drawings, forming a part thereof.

The purpose of this invention is to provide a simple and efficient gearing for transmitting rotation from the propeller shaft of a motor driven vehicle to a speedometer mounted in any convenient position upon the vehicle, preferably on the dash-board.

The invention consists of the features and elements described and shown in the drawings as more particularly indicated by the claims.

In the drawings Figure 1 is a partial plan view of an automobile chassis showing the drive gear installed thereon. Fig. 2 is a detail view partly in section, such section being taken axially with respect to the propeller shaft of the vehicle. Fig. 3 is a partly sectional view of the device, section being taken as indicated at line 3—3 on Fig. 4. Fig. 4 is an end elevation of the housing for the gears.

As indicated in Fig. 1 the present device is designed to be installed so as to transmit to the speedometer, A, the rotation of that part of the propeller shaft, B, which connects the change speed gear, C, with the rear axle and the road wheels, D, driven thereby, since in this way the rotational speed which is being measured by the speedometer will always bear a fixed relation to the actual speed of rotation of the road wheels, D.

It will be seen that if a simple combination of ordinary spur gears were employed for connecting the propeller shaft, B, and the flexible shaft, E, of the speedometer, the said flexible shaft would have a directly forward trend and would thus conflict with the change gear box, C. For this reason the two shafts are connected by spiral gears so that the flexible shaft, E, is given a forwardly oblique trend, whereby it easily passes to one side of the gear box, C, and thence forward and upward to the speedometer, A, mounted on the dash-board.

Fig. 2 shows the driving gear, 1, which is secured fast to the propeller shaft, B, and is provided with a hub sufficiently extended to present journal surfaces, 1ᵃ, to the bearing rings, 2, carried at either end of the housing, 3. This spiral driving gear, 1, meshes with a spiral driven gear, 4, journaled in the upper portion, 3ᵃ, of the housing, 3, and connected with the flexible shaft, E, through a pair of spur gears, 5 and 6, respectively. These spur gears, 5 and 6, are employed for speed-changing purposes in order to avoid too great a difference in the relative size of the driving and driven gears, 1 and 4, thus keeping the size of the device within convenient limits.

It will be noted that the housing, 3, comprises a casting and three cover plates, two of which, 3ᵇ, 3ᵇ, constitute end walls for the portion of the housing encircling the propeller shaft, B, and the third, 3ᶜ, serving to close the portion of the housing in which the spur gears, 5 and 6, are contained. This cover plate, 3ᶜ, is further provided with a journal bearing, 3ᵈ, for the stud shaft, 6ᵃ, of the final gear, 6, to which shaft the flexible shaft, E, may be coupled in the usual well known manner. In assembling the device it may be noted that the gear, 4, will be introduced into its portion of the housing from the lower portion of the housing, 3, before the end plates, 3ᵇ, are applied, and when it is properly positioned in the upper portion of the housing at 3ᵃ, a short shaft, 4ᵃ, is forced into said gear, 4, and the end bearing plug, 3ᵉ, is inserted in the housing, 3ᵃ. The spur gears, 5 and 6, will be positioned before the cover, 3ᶜ, is applied, the shaft, 5ᵃ, being interlocked with the shaft, 4ᵃ, as indicated in Fig. 3. With the end plates, 3ᵇ, and the bearing rings, 2, removed it will be seen that the housing can be slipped on to the propeller shaft for meshing the spiral gears, and the rings, 2, and the plates, 3ᵇ, may be subsequently applied to definitely position the device, packing rings, 7, being inserted at the same time to retain the lubricant with which the housing should be packed.

I claim:—

1. In combination with a power shaft, a gear rigid therewith, a train of gears adapted to be driven by said gear, and a housing for said train, comprising a portion whose bore is greater than the diameter of the gear on the shaft; bushings adapted to be inserted in the bore of said housing at opposite sides of the gear for definitely positioning the housing relatively thereto, and cap plates apertured to admit the power shaft, and adapted to be secured to opposite ends of said housing.

2. In combination, a gear housing having two inter-communicating chambers; and an opening in the first chamber; a gear dimensioned to be inserted through said opening and said chamber into the second chamber; a shaft for said gear; a journal bearing for said shaft formed at one side of the second chamber, the other side having an aperture and a recessed plug dimensioned to fit in said aperture for journaling one end of the gear shaft.

3. A gear housing comprising two chambers connected by a bore adapted to serve as a journal bearing for a shaft, the side wall of one of said chambers being removable to admit gears to said chamber, and having an extension bored to serve as a journal bearing for a second shaft, the other chamber having a circumferential opening, adapted to admit a gear to said chamber, and having a lateral opening axially located to admit the shaft for said gear, and a recessed plug adapted to fit said aperture to serve as a journal bearing for such shaft.

In testimony whereof I have hereunto set my hand at Chicago, Illinois, this 6 day of June 1913.

JOHN K. STEWART.

Witnesses:
  C. B. SMITH,
  S. HUDSON.